(12) United States Patent
Oustiougov et al.

(10) Patent No.: US 7,895,574 B2
(45) Date of Patent: Feb. 22, 2011

(54) SYSTEM AND METHODS FOR AUTOMATICALLY VERIFYING MANAGEMENT PACKS

(75) Inventors: Maxim Oustiougov, Seattle, WA (US); Martin E. Hough, Sammamish, WA (US); Vishal D. Maru, Bellevue, WA (US); Anil Kumar Yadav, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1043 days.

(21) Appl. No.: 11/034,963

(22) Filed: Jan. 14, 2005

(65) Prior Publication Data

US 2006/0161894 A1      Jul. 20, 2006

(51) Int. Cl.
G06F 9/44 (2006.01)
G06F 15/77 (2006.01)
G06F 9/00 (2006.01)

(52) U.S. Cl. .................. 717/121; 717/124; 717/171; 709/221; 713/1

(58) Field of Classification Search .............. None
See application file for complete search history.

(56) References Cited

U.S. PATENT DOCUMENTS

| | | | | |
|---|---|---|---|---|
| 5,265,241 A * | 11/1993 | Arnold et al. | ............ | 710/15 |
| 5,408,618 A * | 4/1995 | Aho et al. | ............ | 710/104 |
| 6,041,347 A * | 3/2000 | Harsham et al. | ............ | 709/220 |
| 6,381,639 B1 * | 4/2002 | Thebaut et al. | ............ | 709/222 |
| 6,449,627 B1 * | 9/2002 | Baer et al. | ............ | 715/206 |
| 6,956,845 B2 * | 10/2005 | Baker et al. | ............ | 370/352 |
| 6,966,060 B1 * | 11/2005 | Young et al. | ............ | 717/177 |
| 7,209,927 B2 * | 4/2007 | Donatelli et al. | ............ | 707/102 |
| 7,305,562 B1 * | 12/2007 | Bianco et al. | ............ | 713/186 |
| 2004/0019672 A1 * | 1/2004 | Das et al. | ............ | 709/223 |
| 2004/0199756 A1 * | 10/2004 | Graves et al. | ............ | 713/1 |
| 2005/0039074 A1 * | 2/2005 | Tremblay et al. | ............ | 714/11 |

* cited by examiner

*Primary Examiner*—Michael J Yigdall
*Assistant Examiner*—Evral Bodden
(74) *Attorney, Agent, or Firm*—Wolf, Greenfield & Sacks, P.C.

(57) ABSTRACT

A method and a computer product executing the method are provide for automatically verifying management packs by an operations manager. The method includes receiving a management pack containing configuration information enabling an operations manager to remotely manage computer systems and computer software, and automatically verifying the management pack by determining whether the management pack satisfies a set of requirements.

20 Claims, 5 Drawing Sheets

SYSTEM AND METHODS FOR AUTOMATICALLY VERIFYING MANAGEMENT PACKS

FIELD OF THE INVENTION

The present invention relates generally to operations management of a network enterprise, and relates more particularly to automatically verifying management packs before the management packs are made available on a commercial basis by the developers of the management packs.

BACKGROUND OF THE INVENTION

Operations managers, such as the Microsoft Operations Manager (MOM), are software tools that allow an administrator to provide custom monitoring and management of networks of computers. The rules and configuration information necessary for managing a network are typically distributed as Management Packs. Before these Management Packs are distributed or imported to or by the operations manager, it is advantageous to test each Management Pack to ensure that is complies with established requirements. However, the testing of Management Packs is a very expensive and time consuming activity. Conventionally, Management Pack testing is performed by the author of the Management Pack as part of the application development. Each Management Pack has to be tested separately for each static field. This may cause a duplication of all the testing efforts. Accordingly, there is a need in the art for an automatic verification tool that can take advantage of commonalities among Management Pack files.

BRIEF SUMMARY OF THE INVENTION

In view of the foregoing, the present invention provides a method, and a computer product executing the method, for automatically verifying management packs. The method includes receiving a management pack containing configuration information enabling an operations manager to remotely manage computer systems and computer software, and automatically verifying the management pack by determining whether the management pack satisfies a set of requirements. Determining whether the requirements are satisfied include, in one embodiment of the invention, verifying that each rule group defined in the management pack is associated with a computer group, and verifying that each rule has a distinct name within a rule group.

In another embodiment of the invention, determining whether the requirements are satisfied includes verifying that each rule defined in the management pack does not begin with "copy of" and does not contain a "%" character, or verifying that a provider is correctly indicated in a provider field for each rule defined in the management pack. In yet another embodiment of the invention, determining whether the requirements are satisfied includes verifying that each event generated by an event rule is associated with a view or an alert, or verifying that each view defined in the management pack is associated with an event generated by an event rule.

In a further embodiment of the invention, determining whether the requirements are satisfied includes verifying that each alert rule defined in the management pack generates a notification to a notification group for each critical error alert, or verifying that each performance counter is associated with a view, rule, or report that uses data collected by that performance counter. In still another embodiment of the invention, determining whether the requirements are satisfied includes verifying that each threshold performance counter is not set to a low number, or verifying that each rule defined in the management pack has an associated knowledge article, and that the knowledge article includes a copyright notice.

In another embodiment of the invention, determining whether the requirements are satisfied includes verifying that a "lastmodifiedby" field is blank, or verifying that no errors occurred after the management pack is imported by the operations manager.

In one embodiment of the invention, the operations manager also receives and an input file. The operations manger then verifies that all computer groups specified in the input file exist in the management pack, all notification groups specified in the input file exist in the management pack, and that notification groups defined in the management pack include only members that are specified by the input file. This embodiment may also verify that a top-level processing rule group is rooted in a management pack hierarchy as defined by the input file, that the top-level processing rule group includes has an associated knowledge article and configuration specification, that processing rule groups specified by the input file exist in the management pack and have an associated knowledge article, and that each processing rule group has at least one rule.

Another embodiment of the invention is directed at a method for automatically verifying a plurality of management packs by an operations manager. This method includes receiving a plurality of management packs containing configuration information enabling an operations manager to remotely manage computer systems and computer software, and automatically verifying the management packs by determining whether the management packs conflict with each other. In one embodiment of the invention management packs conflict with each other if they share the same provider, if they share a processing rule group, or if they share rules, scripts, computer attributes, or computer groups.

Additional features and advantages of the invention are made apparent from the following detailed description of illustrative embodiments which proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

Figure 1A:
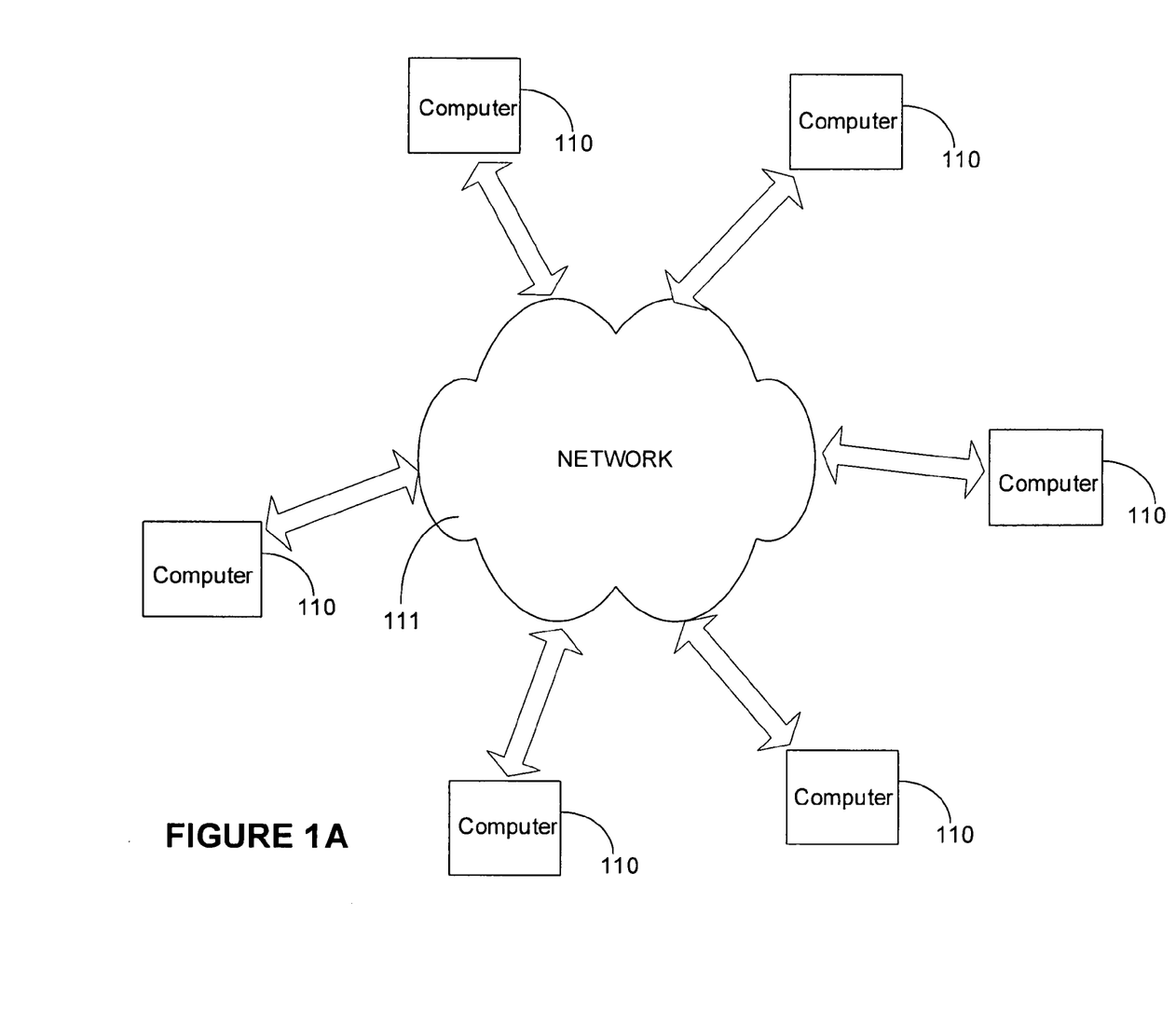
FIG. 1A is a schematic generally illustrating an exemplary network environment across which the present invention operates.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, quarantine servers, or peers with respect to other computers. Accordingly, the various embodiments of the invention may be practiced on clients, network servers, quarantine servers, peers, or combinations thereof, even though specific examples contained herein do not refer to all of these types of computers.

Figure 1B:
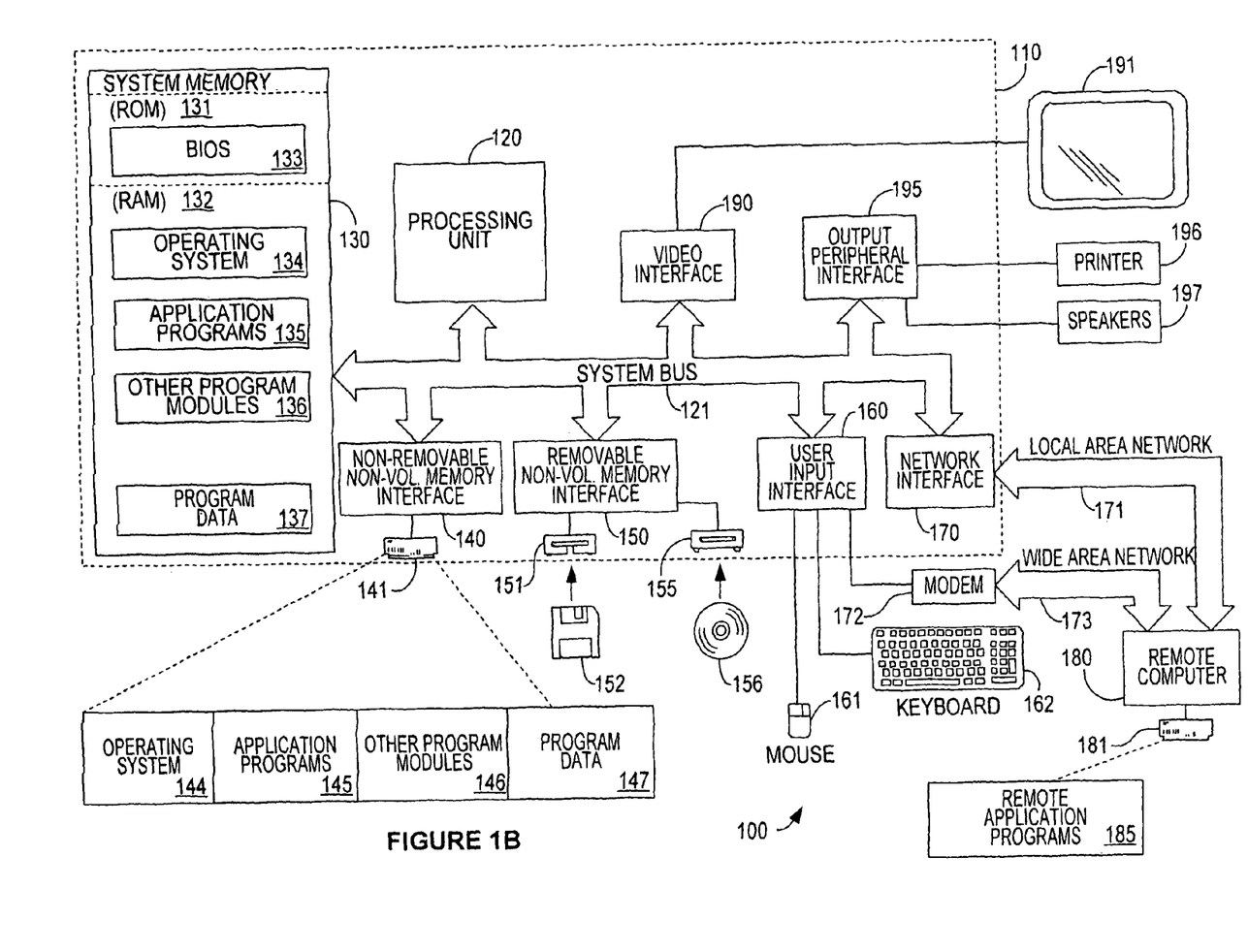
FIG. 1B is a block diagram generally illustrating an exemplary computer system on which the present invention resides.

FIG 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, cellular phones, personal digital assistants (PDA), multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG 1B, an exemplary system for implementing the invention includes a general-purpose computing device in the form of a computer 110, which may act as a client, network server, quarantine server, or peer within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 may operate in a networked environment using logical connections to one or more remote computers, such as a remote computer 180. The remote computer 180 may be another personal computer, a server, a router, a network PC, a peer device, or other common network node and typically includes many or all of the elements described above relative to the personal computer 110 although only a memory storage device 181 has been illustrated in FIG. 1B. The logical connections depicted in FIG 1B include a local area network (LAN) 171 and a wide area network (WAN) 173 but may also include other networks. Such networking environments are commonplace in offices, enterprise-wide computer networks, intranets, and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The Operations Manager (OM)

Figure 2:
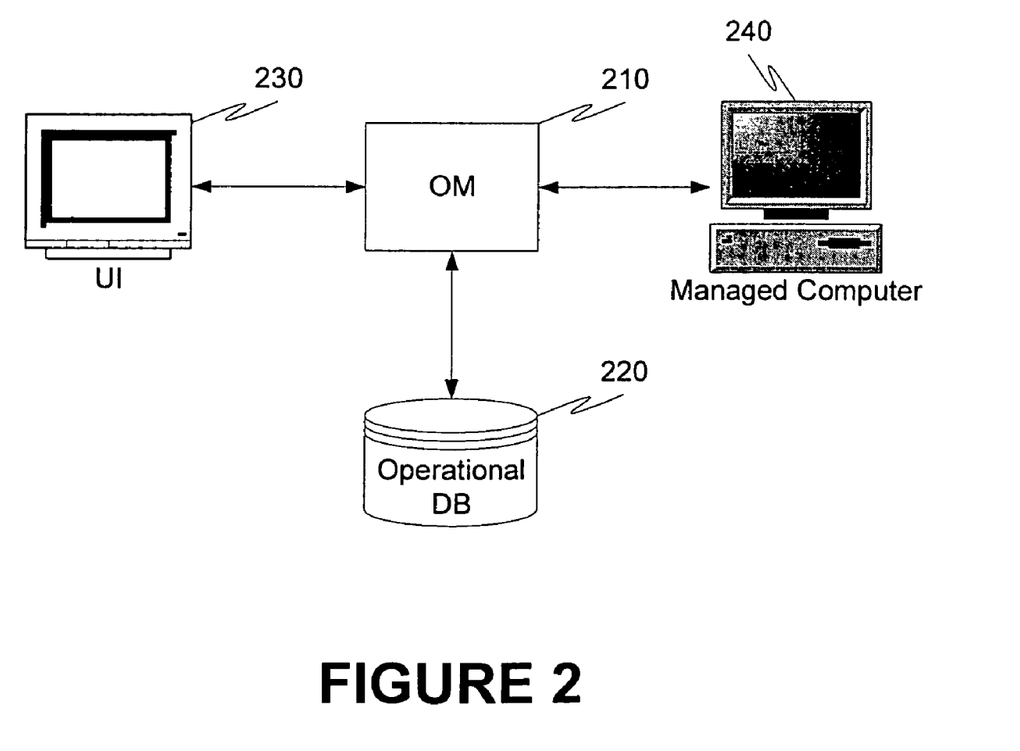
FIG. 2 is schematic of a managed computer network.

FIG. 2 depicts a system in which the operations manager may be employed. In one embodiment, the operations manager may be a Microsoft Operations Manager available from the Microsoft Corporation. In FIG. 2, the operations manager is employed on an operations management server 210, which is responsible for managing managed computer 240. Operational database 220 is used to store operational data regarding the managed computer 240. In a typical environment, there are many managed computers 240 that are managed by the same operations management server 210. The operations management server 210 further includes a management pack (not shown), which is a file containing the rules that are applied to the managed computer(s) 240. Further, a user interface (UI) 230 is provided for administration of the operations management server 210, as well as authoring or importing management packs.

The Management Pack (MP)

Management packs serve as a container and distribution vehicle that the OM uses to deploy the configuration information required for managing computers and applications. A Management Pack includes a collection of rules, knowledge, and public views. The Management Pack makes it possible to collect a wide range of information from different sources. Management Packs are used to determine how the OM collects, handles, and responds to data. Management Packs may be tailored to individual environments. There is no generic, one size fits all Management Pack. The complexity and specific requirements of the computers and applications that organizations have to manage requires varying degrees of specificity. For example, a valid performance indicator for the operating system probably may not transpose well to an application.

Management Pack may contain, but is not limited to:

A list of Rule Groups that contain rules.

A list of Rules for each Rule Group.

A list of Provider Instances that the Rules reference.

A list of Scripts that Rules need to call in response to an event.

A list of registry-based Computer Attributes that are needed for discovery.

A list of Computer Groups whose formula depends on the specified Computer Attributes.

A list of Computer Group and Rule Group associations that specify rule targets.

A list of Notification Groups that notification responses use in rules.

A list of view instances definitions that define how the operations data produced by managed computers should be viewed.

A list of Tasks that a user might need for managing the application.

The Service Discovery Class Schema that defines the entities that will be managed, their properties, and their relationship to other properties.

The Diagram Definitions that describes how service discovery data should be viewed as a diagram from an application perspective.

Knowledge associated with the rules which specify how problems should be corrected and how the Management Pack should be used.

In one embodiment of the invention, management packs may have three formats. The first is a binary file called an AKM file. Management packs are usually distributed in this format. The second format is an XML file that describes the contents in human readable form. This format is used to edit and compare Management Packs. The third format is a database format used to store information in the database by importing a Management Pack (in binary or XML format) into a database.

Computer groups contain a list of computers that are viewed and handled as a single entity. The OM may use technology-based computer groups to target rules and supports nested computer groups as well as multi-group membership. The benefit of using computer groups is that monitoring views and operations responsibility can reflect the way a business is organized, as well as the roles that your computers support. For example, by region (East Coast, West Coast), by business unit (marketing, manufacturing), or by function (mail servers, database servers).

Computer group rules are used to define how similar computers are grouped together. The following criteria may be used for creating a computer group:

By domain membership or computer name, using wildcards, regular expressions, or Boolean regular expressions.

By computer attributes, choosing from existing attributes (for example, operating system version), or by using a formula to create attributes.

By inclusion or exclusion for a group, regardless of shared attributes or individual characteristics.

Computer groups can be dynamic. For example, computer group Windows 2000 is defined as all the computers that are running Windows 2000 Server. This group includes all the discovered computers that are running Windows 2000 Server when the rule was created and any computers that had Windows 2000 Server installed after the rule was created. If you remove Windows 2000 Server from a managed computer, this computer no longer satisfies the group criteria and it is no longer a part of the Windows 2000 computer group. Periodic scans of managed computers may be performed to refresh group memberships according to the existing rules. Management packs define specific computer groups according to the application or technology that the pack was written to monitor. For example, the Exchange 2000 computer group is pre-defined and part of the Exchange Management Pack.

Rule groups contain collections of rules for monitoring different aspects of a managed computer. The OM uses rules to determine how to collect, process, and respond to data generated by managed computers. In one embodiment of the invention, depending on the type of information a rule processes, rules are categorized as event rules, alert rules, and performance rules. These rule types use different data sources and serve different purposes. In addition to defining the data that the OM collects and stores in the operational database, rules are used to refine operational data. Some typical examples of rule subtypes are rules that respond to a specific event, filter an event, handle alert processing, and measure performance.

Rules may contain the following elements: data providers, criteria, responses, and a knowledge base. Data providers identify the source of the data and are used to determine how the data is collected. Criteria isolate the specific data to collect from the source and establish the conditions for a rule match. Responses specify what should be done when collected data matches the criteria that are defined for a rule. When a rule match occurs, the OM performs the actions specified as a rule response. For example, a rule that matches a specific event ID might specify that the event is stored in the database, generates an alert, and sends an e-mail message to a network administrator.

The OM uses event rules to monitor events and in some cases, specify that alerts are generated and responses are initiated. Most events and their associated alerts are stored in an operational database. Event collection rules identify events with specific criteria to be collected from specific sources. Collection rules do not generate alerts or initiate responses. Missing event rules specify that an alert is generated or response is initiated when an event does not occur during a specified period. Missing event alerts are stored in the operations database. Event consolidation rules group similar events on a managed computer into summary events that are stored in the operations database. Event filtering rules specify that certain events should be ignored. Filtering rules typically identify events that you do not consider significant for monitoring purposes.

Alert rules specify a response for an alert or for a collection of pre-defined alerts. For example, a user can specify that a High Priority Notification Group is paged for all Critical Error alerts generated by the rules in a SQL Server Rule Group.

Performance rules define how performance counter data and numeric data are processed. Measuring rules collect numeric values from sources such as WMI or Windows performance counters. The sampled numeric measures are stored in the operations database. Measuring rules can also include responses. Threshold rules specify that an alert is generated or a response initiated when a numeric measure meets or exceeds a defined threshold.

The knowledge base is a collection of information that is associated with a rule or a rule group. This knowledge describes the meaning, importance, and possibly the resolution for a relevant condition or problem that is linked to a rule. When you view the properties of an alert in the Alert view, you can examine the knowledge base content that is associated with the rule that generated the alert. Another aspect of the knowledge base, called the company knowledge, contains information that is created and stored by the user. A user can add information to the company knowledge when you create or edit a rule.

Notifications are the messages configured for rules and these notifications are organized as notification groups. A notification group contains a list of operators that a user creates. When a user creates an operator they provide an operator name and specify how the user should be notified, as well as when the user is available to receive notifications. After the user creates an operator it can be added to an existing notification group.

Depending on the Management Pack that is installed, notification groups might contain default groups configured to receive notifications from rules defined in the Management Pack. For example, the OM Management Pack may contain a group named Operators and two notification groups: Operations Manager Administrators and Operations Management Notification Testing.

Service discovery is the process of discovering roles, components, and relationships for managed computers. Service discovery also obtains information about managed computers and their relationships. The information obtained by service discovery is used for multiple purposes, and includes:

- Identifying roles, instances, components, relationships, and attributes.
- Providing information such as the inventory of managed computers.
- Providing the information that can be used to group computers that share common properties. These groups are called Computer Groups and the formula used to define a computer group requires the information that is obtained from service discovery.
- Providing information that can be used for status monitoring.
- Providing information can be used to create and present a diagram of the managed computers and their interrelationships.
- Providing information that can be used to define targets for specific tasks. When a user starts a task that is authored for a specific class of component, the instances found through service discovery provide the list of possible task targets.

The service discovery schema is a specification of the types of entities and their relationships with other entities. Typically, the Management Pack author defines the service discovery schema for the application that needs to be managed. The service discovery schema consists of two key elements, a Class and a Relationship Type. A class represents the type of an entity. Some examples are Computer class, a SQL Server class, and an Exchange Routing Group class. Instances of different classes may be related to each other for various reasons. For every instance where a class is related to another class, a relationship type must be defined. The relationship type schema is stored in the operations database and is inserted during a Management Pack import.

The service discovery schema itself does not contain any information about how to populate the classes and specified relationships. The Management Pack that defines the service discovery schema also provides rules that are targeted to set of computers—these rules define how to populate the schema. The service discovery rules have script responses that contain the business logic for discovering the appropriate entities.

Registry-based computer attributes are a special case of service discovery schema that extends the Computer class by adding new properties. The Registry Based Computer Attribute definition also defines how that attribute is discovered and populated. Unlike the other parts of the schema, registry-based computer attributes do not require a service discovery rule specified in a Management Pack. During runtime, dynamically created rules are used to generate discovery data that populates any Computer class properties that were added because of a Registry Based Computer Attribute.

The definition of a registry-based computer attribute specifies a registry path or a value for a specific computer. The property value of an instance of a Computer class becomes the value for that registry value on that computer. Registry-based computer attributes are used to find information about a computer, such as detecting what applications are installed. Computer groups use these attributes to group computers that have certain applications installed. As a result, rules that monitor specific applications can be targeted to a computer group whose members only have a specific application installed.

A provider is the data source that a rule monitors. For example, an event provider sends data from an event log. Providers are imported with Management Packs and a user can create custom providers for rules.

automatically verifying the management pack (MP)

Figure 3:
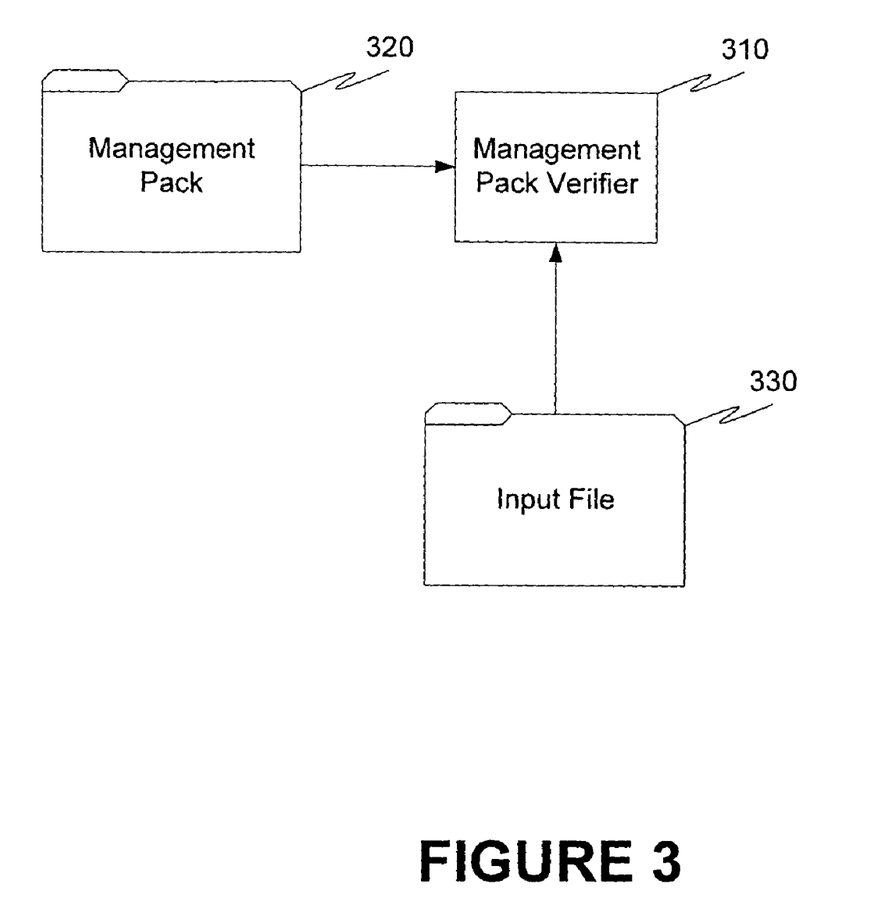
FIG. 3 is a schematic of a management pack verifier.

FIG. 3 illustrates the components involved in the automatic verification of management packs. The management pack verifier 310, which may or may not be included as part of the operations manager 210 in FIG. 2, receives the management pack 320 and the input file 330. The input file 330 may be an XML file describing required syntax or semantics of the management pack 320.

Figure 4:
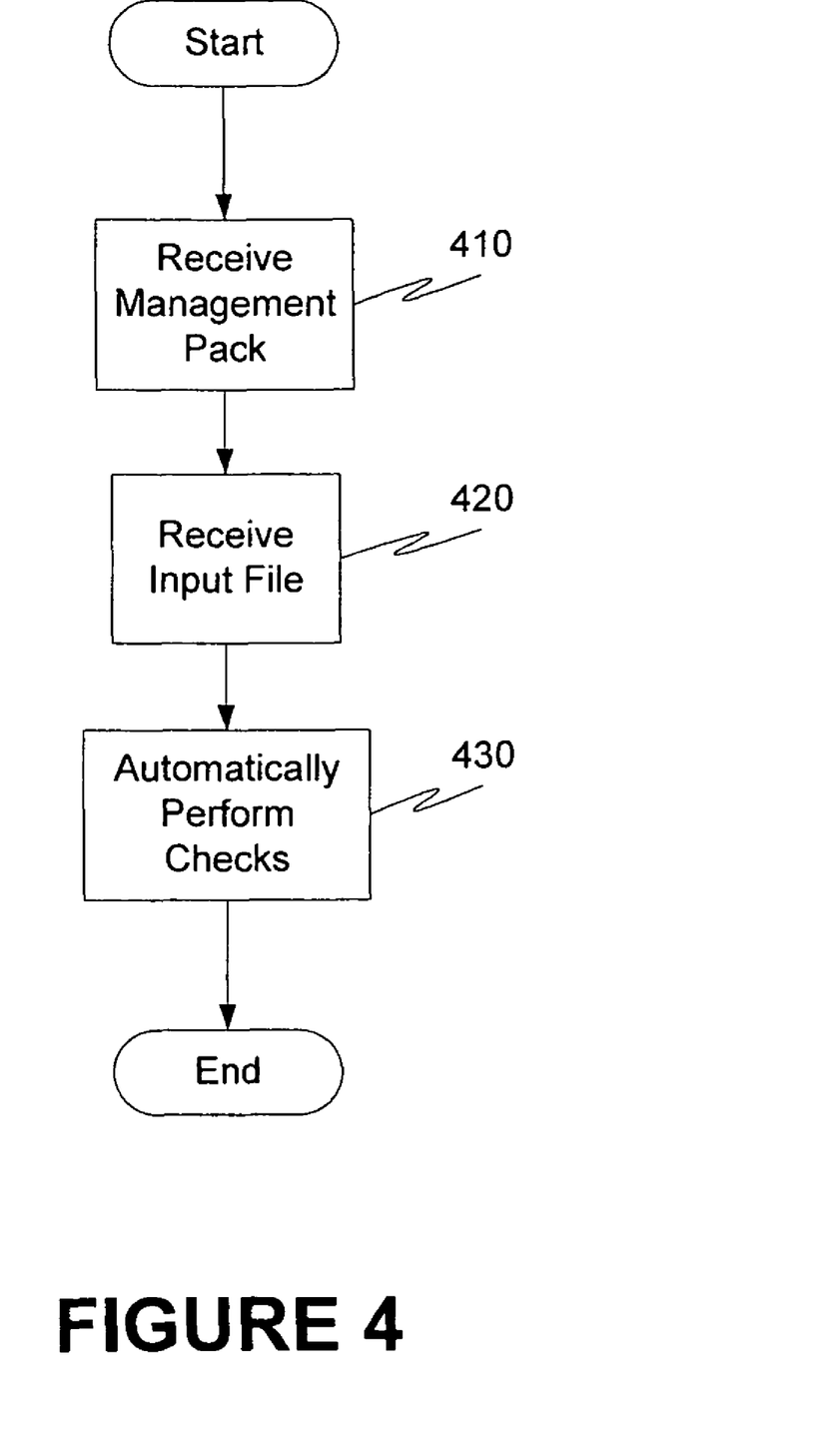
FIG. 4 is a flow diagram illustrating a management pack verification method of the claimed invention.

The process of automatically verifying a management pack is depicted in FIG. 4. At step 410, the management pack verifier receives one or more management packs. At step 420, the management pack verifier receives an input file with a specification for the management pack. At step 430, the management pack verifier performs a set of checks on the management pack to ensure the management pack complies with established requirements, as well as the specification provided in the input file. The checks, as well as the established requirements and specification, are described below in greater detail.

The management pack verifier may automatically perform any or all of the following checks to verify the management pack:

- Verify that the user interface does not show errors after importing a management pack.
- Verify that the installation logs of the operations manager have no errors.
- Verify that the top level processing rule group is correctly rooted in the management pack hierarchy, as defined by the input file.
- Verify that the top level processing rule group has a knowledge base section and a configuration information section. The syntax of the knowledge base may also be verified against a predetermined syntax, or one provided in the input file.
- Verify that all the processing rule groups specified in the input file are correctly created. In one embodiment there are 3 processing rule groups: terminal services-specific group, a session directory-specific, group, and a licensed serverware specific group.
- Verify that all rule groups are enabled by default.
- Verify that each of the rule groups has a knowledge base article associated with it.
- Verify that all the computer groups specified in the input file exist in the management pack.
- Verify all the notification groups specified in the input file exist in the management pack.
- Verify that each notification group has only those members as defined in the input file.
- Verify that the lastmodifiedby field is left blank.
- Verify that no rules begin with "Copy Of".
- Verify that the Provider is correct for each rule.
- Verify that each view defined in the management pack is associated with event generated by an event rule.
- Verify that each event generated by an even rule is associated with one of a view and an alert.
- Verify that all rule groups are associated with a computer group or they descend from a processing rule group that is associated with a computer group.
- Verify that rule groups that say they are "shared" really are.
- Verify that rule names do not contain % symbols.
- Verify that there is not more than one rule with the same name in the same group.
- Verify that the processing rule groups have at least one rule (event processing, alert processing or performance processing).

Verifying that each alert rule defined in the management pack generates a notification to a notification group for each critical error alert.

Verify that each performance counter corresponds to a rule, view or report that uses its performance data.

Verify that each threshold performance counter value is not set to a low number such as zero.

Verify that that all the rules have knowledge article that is not left blank.

Verify that all knowledge base articles have copyrights.

Where the management pack verifier receives multiple management packs at the same time, the management packs may be checked for conflicts. The management pack verifier automatically performs any or all the following checks:

Verify that there are no duplicate providers among management packs.

Verify that processing rule groups from one management pack are not shared with other management packs.

Verify the absence of shared rules, scripts, computer attributes and computer groups among management packs.

Accordingly, the various embodiments of the present invention tremendously reduce the time it takes to test a Management Pack and it allows the developers/authors of the Management Pack to focus on incorporating the knowledge that they and only they could provide. In other words, by automating the routine aspects of a Management Pack development, the various embodiments of this invention make the development process more efficient.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for automatically verifying management packs of a plurality of different types suitable for use in performing different management tasks, the management packs of the plurality of different types having in common one or more fields for storing information, the method comprising acts of:

receiving a management pack authored by at least one developer, the management pack containing configuration information enabling an operations manager to remotely manage computer systems and computer software, wherein at least some of the configuration information is stored in the one or more fields common to the management packs of the plurality of different types, and wherein the configuration information comprises at least one rule to be applied to at least one remotely managed computer system to configure how the operations manager collects, handles, and responds to data;

obtaining a set of requirements with respect to the one or more fields common to management packs of the plurality of different types;

automatically verifying the management pack authored by the at least one developer before the operations manager imports the management pack, the act of automatically verifying comprising:

determining statically whether the one or more fields of the management pack satisfy the set of requirements; and verifying whether the at least one rule satisfies at least one requirement, the verifying comprising at least one of:

verifying that a provider is correctly indicated in a provider field for each rule defined in the management pack;

when the one or more fields common to management packs of the plurality of different types comprise one or more event rules, verifying that each event generated by an event rule is associated with one of a view and an alert;

when the one or more fields common to management packs of the plurality of different types comprise one or more event rules, verifying that each view defined in the management pack is associated with event generated by an event rule;

when the one or more fields common to management packs of the plurality of different types comprise one or more alert rules and one or more notification groups, verifying that each alert rule defined in the management pack generates a notification to a notification group for each critical error alert;

when wherein the one or more fields common to management packs of the plurality of different types comprise one or more performance counters, verifying that each performance counter is associated with one of a view, rule, and report that uses data collected by that performance counter;

when wherein the one or more fields common to management packs of the plurality of different types comprise one or more performance counters, verifying that each threshold performance counter is not set to zero; and when the one or more fields common to management packs of the plurality of different types comprise one or more rules, verifying that each rule defined in the management pack has an associated knowledge article, and that the knowledge article includes a copyright notice; and selectively making the management pack available for import by the operations manager based on an outcome of the act of automatically verifying the management pack.

2. The method of claim 1, wherein the one or more fields common to management packs of the plurality of different types comprise one or more computer groups and one or more rule groups, each rule group comprising one or more rules, and wherein automatically verifying the management pack includes:

verifying that each rule group defined in the management pack is associated with a computer group; and verifying that each rule has a distinct name within a rule group.

3. The method of claim 1, wherein the one or more fields common to management packs of the plurality of different types comprise one or more rules, and wherein:

automatically verifying the management pack includes determining whether each rule defined in the management pack begins with "copy of" and whether a name of each rule defined in the management pack contains a "%" character; and the act of selectively making the management pack available comprises making the management pack available when no rules defined in the management pack begin with "copy of" and no names of rules contain a "%" character.

4. The method of claim 1, wherein the one or more fields common to management packs of the plurality of different types comprise one or more rules, and wherein automatically verifying the management pack includes verifying that a provider is correctly indicated in a provider field for each rule defined in the management pack.

5. The method of claim 1, wherein the one or more fields common to management packs of the plurality of different types comprise one or more event rules, and wherein automatically verifying the management pack includes verifying that each event generated by an event rule is associated with one of a view and an alert.

6. The method of claim 1, wherein the one or more fields common to management packs of the plurality of different types comprise one or more event rules, and wherein automatically verifying the management pack includes verifying that each view defined in the management pack is associated with event generated by an event rule.

7. The method of claim 1, wherein the one or more fields common to management packs of the plurality of different types comprise one or more alert rules and one or more notification groups, and wherein automatically verifying the management pack includes verifying that each alert rule defined in the management pack generates a notification to a notification group for each critical error alert.

8. The method of claim 1, wherein the one or more fields common to management packs of the plurality of different types comprise one or more performance counters, and wherein automatically verifying the management pack includes:

verifying that each performance counter is associated with one of a view, rule, and report that uses data collected by that performance counter; and/or verifying that each threshold performance counter is not set to zero.

9. The method of claim 1, wherein the one or more fields common to management packs of the plurality of different types comprise one or more rules, and wherein automatically verifying the management pack includes verifying that each rule defined in the management pack has an associated knowledge article, and that the knowledge article includes a copyright notice.

10. The method of claim 1, wherein automatically verifying the management pack includes verifying that a "lastmodifiedby" field is blank.

11. The method of claim 1, further comprising verifying that no errors occurred after the management pack is imported by the operations manager.

12. The method of claim 1, wherein obtaining a set of requirements comprises receiving an input file.

13. The method of claim 12, wherein automatically verifying the management pack includes:

verifying that all computer groups specified in the input file exist in the management pack;

verifying that all notification groups specified in the input file exist in the management pack; and verifying that notification groups defined in the management pack include only members that are specified by the input file.

14. The method of claim 12, wherein automatically verifying the management pack includes:

verifying that a top-level processing rule group is rooted in a management pack hierarchy as defined by the input file;

verifying that the top-level processing rule group includes an associated knowledge article and configuration specification;

verifying that processing rule groups specified by the input file exist in the management pack and have an associated knowledge article; and verifying that each processing rule group has at least one rule.

15. A method for automatically verifying a plurality of management packs by an operations manager, the plurality of management packs being of one or more of different types suitable for use in performing different management tasks, the plurality of management packs having a plurality of fields for storing information, the method comprising acts of:

receiving a plurality of management packs authored by at least one developer, the plurality of management packs containing configuration information enabling an operations manager to remotely manage computer systems and computer software, wherein at least some of the configuration information is stored in the plurality of fields of the plurality of management packs, and wherein the configuration information comprises at least one rule to be applied to at least one remotely managed computer system to determine how the operations manager collects, handles, and responds to data; and automatically verifying the plurality of management packs authored by the at least one developer, prior to the operations manager importing the plurality of management packs, comprising:

determining statically whether a first field of a first of the plurality of management packs conflicts with a second field of a second of the plurality of management packs, wherein the first field conflicts with the second field if the first field and the second field share at least one of:

a provider;

a processing rule group;

a rule;

a script;

a computer attribute; and a computer group; and verifying whether the at least one rule satisfies at least one requirement; and selectively making the plurality of management packs available for import by the operations manager based on an outcome of the act of automatically verifying the plurality of management packs.

16. The method of claim 15, wherein the first field conflicts with the second field if they share the same provider.

17. The method of claim 15, wherein the first field conflicts with the second field if they share a processing rule group.

18. The method of claim 15, wherein the first field conflicts with the second field if they share one of rules, scripts, computer attributes, and computer groups.

19. A computer storage medium having computer-executable instructions for performing acts for automatically verifying management packs, the management packs having one or more fields for storing information, the one or more fields comprising at least one rule to be applied to at least one remotely managed computer system, and the acts comprising:

receiving a management pack authored by at least one developer, the management pack containing configuration information enabling an operations manager to remotely manage computer systems and computer software, wherein at least some of the configuration information is stored in the one or more fields;

receiving an input file comprising a set of requirements with respect to the one or more fields;

automatically verifying the management pack authored by the at least one developer, prior to the operations manager importing the management pack, at least partially by determining statically whether the one or more fields of the management pack satisfy the set of requirements; and selectively making the management pack available for import by the operations manager based on an outcome of the act of automatically verifying the management pack.

20. The computer storage medium of claim 19, wherein the input file is an XML file.

* * * * *